(12) United States Patent
Mani (10) Patent No.: US 9,160,473 B2
(45) Date of Patent: Oct. 13, 2015

(54) ASYMMETRY CORRECTION FOR PRECISE CLOCK SYNCHRONIZATION OVER OPTICAL FIBER

(71) Applicant: Symmetricom, Inc., San Jose, CA (US)

(72) Inventor: Sanjay Mani, Los Altos Hills, CA (US)

(73) Assignee: MICROSEMI FREQUENCY AND TIME CORPORATION, San Jose, CA (US)

( * ) Notice: Subject to any disclaimer, the term of this patent is extended or adjusted under 35 U.S.C. 154(b) by 162 days.

(21) Appl. No.: 13/800,446

(22) Filed: Mar. 13, 2013

(65) Prior Publication Data

US 2014/0270805 A1    Sep. 18, 2014

(51) Int. Cl.
*H04B 10/00* (2013.01)
*H04J 3/06* (2006.01)

(52) U.S. Cl.
CPC .................................. *H04J 3/0667* (2013.01)

(58) Field of Classification Search
USPC .................................................. 398/154–156
See application file for complete search history.

(56) References Cited

U.S. PATENT DOCUMENTS

| 7,787,438 | B2 * | 8/2010 | Dowse | 370/350 |
| 8,472,370 | B2 * | 6/2013 | Shin et al. | 370/326 |
| 2005/0232384 | A1 * | 10/2005 | Heid et al. | 375/354 |
| 2007/0127919 | A1 * | 6/2007 | Kallstenius | 398/25 |
| 2008/0151771 | A1 * | 6/2008 | Dowse | 370/252 |
| 2009/0147806 | A1 * | 6/2009 | Brueckheimer | 370/503 |
| 2011/0299853 | A1 * | 12/2011 | Zampetti et al. | 398/98 |
| 2012/0269204 | A1 | 10/2012 | Zampetti | |
| 2013/0077964 | A1 | 3/2013 | Mani | |
| 2013/0202291 | A1 * | 8/2013 | Cavaliere et al. | 398/33 |
| 2013/0315606 | A1 * | 11/2013 | Lanzone et al. | 398/154 |
| 2013/0322872 | A1 * | 12/2013 | Jobert et al. | 398/25 |
| 2014/0219651 | A1 * | 8/2014 | Ruffini et al. | 398/33 |
| 2014/0226984 | A1 * | 8/2014 | Roberts et al. | 398/66 |
| 2014/0270805 | A1 * | 9/2014 | Mani | 398/155 |

* cited by examiner

*Primary Examiner* — Augustin Bello
(74) *Attorney, Agent, or Firm* — Patterson & Sheridan, LLP (57) ABSTRACT

A clock at a first network element that is connected to a second network element over an optical fiber link is aligned in time/phase using packet protocols such as PTP. The invention discloses how to correct the asymmetry error inherent in traditional packet-based time-transfer methods.

20 Claims, 7 Drawing Sheets

ASYMMETRY CORRECTION FOR PRECISE CLOCK SYNCHRONIZATION OVER OPTICAL FIBER

BACKGROUND OF THE INVENTION

1. Field of the Invention

Embodiments of the present invention relate generally to time and frequency alignment systems operating over communications networks and, more specifically, to methods and apparatus for precision time transfer over optical fiber.

2. Description of the Related Art

It has been recognized that synchronizing network elements in optical communications networks to a high level of precision enables the provision of advanced services. Consequently, time and frequency alignment are essential to certain types of systems operating in conventional optical networks. For example, accurate time alignment is required by cellular networks, services carried out in real time over a network, and network elements that use packet-based signal formats for multiplexing, transmission, and switching. Similarly, frequency alignment is required in time-division multiplexing (TDM) and media streaming systems that require fixed video or audio sample rates across multiple clients.

One approach known in the art that provides both time and frequency alignment involves computing an aligned time signal based on a master timing signal from a primary reference clock, such as a global positioning system (GPS) satellite timing signal, which is held in precise alignment with a global clock reference. Using GPS signals or other master timing signals at each network element to achieve time or frequency alignment is generally prohibitively expensive and requires each network element to be able to receive satellite time signals from GPS satellites. There are many situations where visibility of GPS satellites may be compromised, interfered with, or interrupted. Consequently, an alternative approach to time alignment is to transmit timing alignment information via a protocol that is operable within a given communications network.

Packet-based network synchronization methods such as Precision Time Protocol (PTP) and Network Time Protocol (NTP) transfer time and frequency references using packets containing time stamps that identify the times of departure/arrival of packets. These protocols can be used to distribute timing and frequency alignment throughout a network in a point-to-point fashion similar to the way that TDM networks distribute frequency alignment, as described above. For convenience the discussion here considers PTP though essentially identical statements apply in the case of NTP and all other packet-based time transfer methods.

A PTP "grandmaster" can transfer time to a network element coupled to it, a "slave" instantiated on that network element can reconstitute the time, and then a "master" connected to the slave in the same network element can transfer time to a subsequent network element in this point-by-point fashion. PTP and NTP can also operate in a mode where the "slave" clock in a network element can communicate directly with the "master" clock system for timing purposes. In all cases, the accuracy of two-way time-transfer protocols is adversely affected by asymmetry introduced by the communications network connecting the two network elements, including asymmetry in the physical medium, asymmetry in the construction of the forward and reverse paths in the network elements, and other sources. PTP and NTP assume that transit delays between master and slave clocks are symmetric, i.e., the transfer packet delay from a master clock to a slave clock is equal to the transfer packet delay from the slave clock to the master clock. But because forward and reverse physical paths are often different in coupled network elements, they are typically not symmetric.

Networks over which two way time transfer ranging protocols such as PTP and NTP are employed often use separate fiber strands for carrying signals in each direction, i.e., slave-to-master and master-to-slave, and assembly and deployment methods of communication networks often include short lengths of cable for mounting convenience that vary the forward and reverse path lengths between network elements by an unknown amount. The asymmetry in transit delay resulting from such variation in path length can be tens of nanoseconds or much more, while the desired level of time accuracy and time stability in a fiber-optic communication network can be on the order of nanoseconds. Thus, the ability of PTP and NTP to accurately transfer time between network elements in a fiber-optic network is limited. Specifically, the asymmetry in transit delay of timing packets between slave and master clocks provides a bound to the accuracy of time transfer.

SUMMARY OF INVENTION

Embodiments of the present invention provide methods for improving the accuracy of synchronization when a clock at a first network element is to be time-aligned with a clock in a second network element. The first and second network elements are connected over an optical fiber link, in which signal transmission from the first network element to the second network element is carried in a different optical fiber strand than the signal transmission from the second network element to the first network element. Timing signals comprising time-stamped packet flows (also referred to as bursts) are exchanged between the two network elements according to a packet-based method protocol such as PTP and the clock at the second network element designated the slave is aligned using the timing information contained in the packet stream to the clock in the first network element, considered the master. The time-alignment error that is introduced in such methods as PTP and NTP is bounded from below by the asymmetry of propagation in the two fiber strands. The present invention identifies methods for calibrating the asymmetry of the strands, thereby improving the accuracy of the time alignment.

In one embodiment the asymmetry is quantified by measuring the difference in phase between two wave-fronts that are propagating at two different frequencies that are very close to, but not equal to, the nominal center frequency.

In another embodiment, the slave-side clock is aligned with the master-side clock using conventional PTP and thereby has a time-alignment error that is one-half the asymmetry viewed in time units. The return signal sent from the slave to the master is made coherent with this time and the phase difference between the send and return signals is measured at both the master and slave side and the time-alignment error estimated from these measurements.

According to other embodiments of the present invention, transit delays through an optical fiber link that connects a slave and a master are determined based on identifying and numbering (naming) particular events such as rising edges of the clock to resolve cycle ambiguities.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
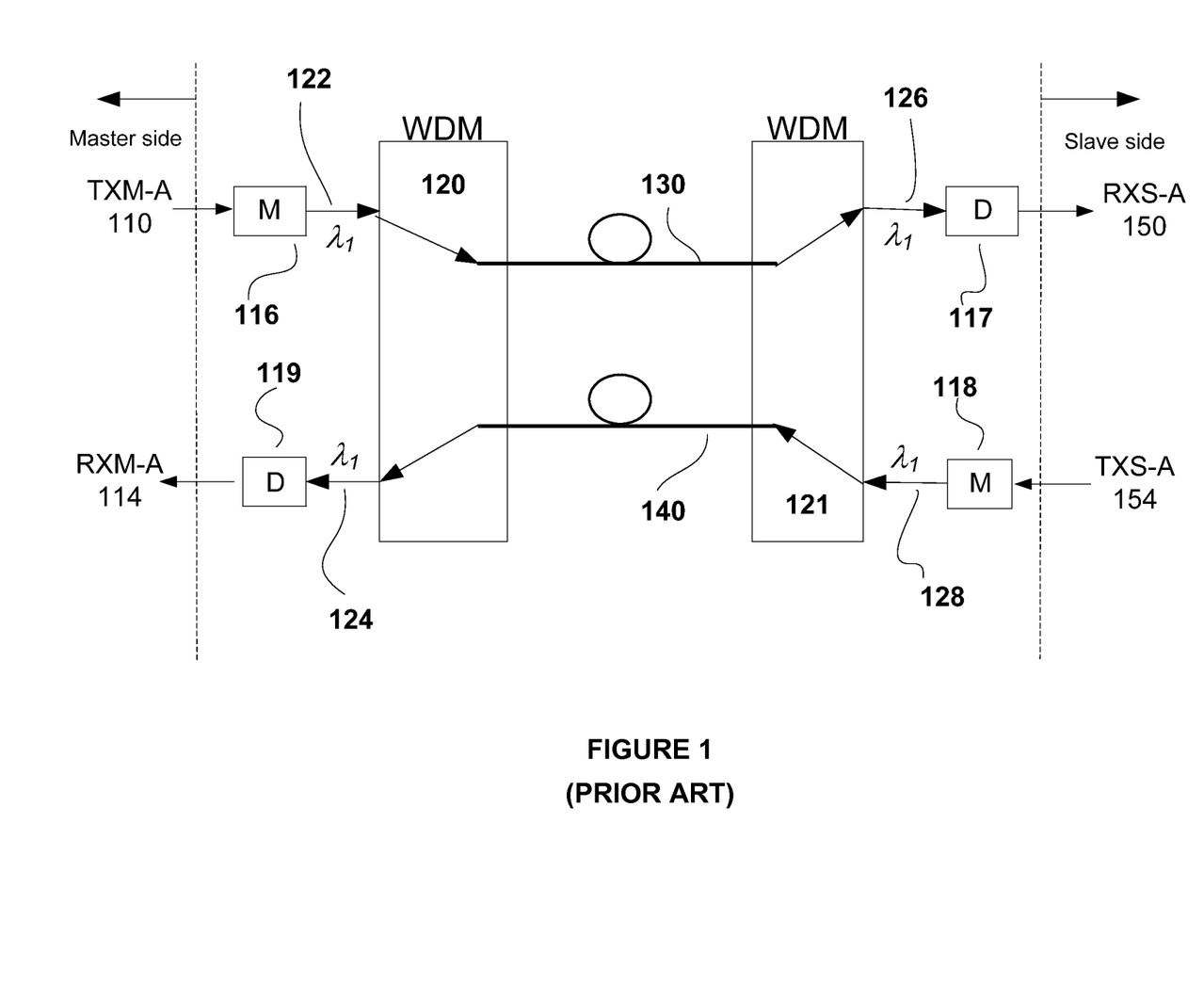
FIG. 1 depicts a conventional connection between a master and slave over an optical link using one strand in each direction.

FIG. 1 depicts a conventional connection between master and slave clocks over a fiber optic channel. Not explicitly shown in FIG. 1 are the master and slave clock devices themselves. In the downstream direction (master to slave direction) the transmit signal from the master device, designated as TXM-A 110, is electrical in nature. This is converted into an optical signal 122 with wavelength $\lambda_1$ by the optical modulator ("M") 116. It will be obvious to one skilled in the art to provide the light-source to supply the optical modulator 116 with the optical carrier and this source is not shown in the figure. In some modern fiber-optic transmission gear a wavelength division multiplexing WDM function 120 is applied so that multiple optical wavelength channels can share the same fiber optic strand 130. The WDM function at the slave side 121 extracts the wavelength $\lambda_1$ signal 126 that is converted into an electrical signal by the optical demodulator ("D") converter 117 and delivered as the receive signal RXS-A 150 to the slave clock. In the embodiments described here the electrical signals TXM-A 110 and RXS-A 150 are Ethernet signals. For example, for Gigabit Ethernet, the electrical signals are pulsed signals with an underlying carrier clock rate of 1.25 GHz. In some equipment there is no WDM, and only one wavelength is transmitted on a fiber strand, so no wave length division multiplexing is required. The embodiments described here are not conditional on the existence of WDM.

In the upstream direction (slave to master direction) the transmit signal from the slave device, designated as TXS-A 154, is electrical in nature. This is converted into an optical signal 128 with wavelength $\lambda_1$. If WDM is employed, the wavelength division multiplexing WDM function 121 is applied so that multiple optical wavelength channels can share the same fiber optic strand 140. If WDM is not employed then the optical signal 128 is applied directly to the fiber. The WDM function at the master side 120 extracts the wavelength $\lambda_1$ signal 124 that is converted into an electrical signal and delivered as the receive signal RXM-A 114 to the master clock. If WDM is not employed the optical signal is taken directly from the fiber.

For simplicity, in FIG. 1 optical signals of other wavelengths are not shown.

Figure 2:
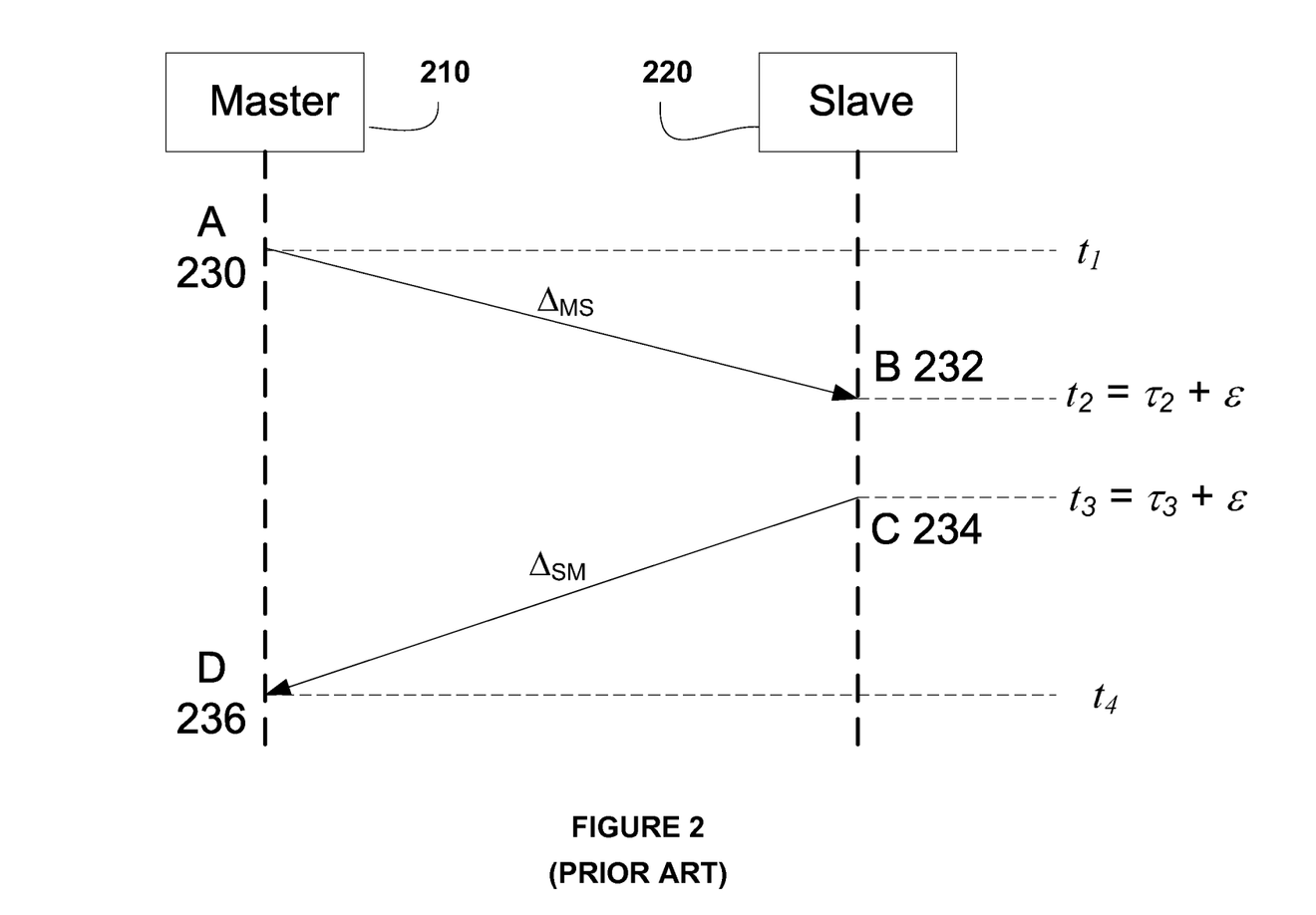
FIG. 2 provides an event diagram illustrating the timestamps associated with the times of departure and times of arrival of packets constituting the two-way timing signal as the packets are transferred between master and slave.

Traditional packet-based two-way time transfer methods follow the event diagram shown in FIG. 2. The terminology used here is that from PTP but the same principles apply to all methods and protocols. Referring to FIG. 2, the sequence of events and important items of information associated with an exchange of packets between master 210 and slave 220 are:

Event A 230: Packet is transmitted by Master and time-of-departure is $t_1$.

Event B 232: Packet arrives at Slave that measures the time-of-arrival as $\tau_2$; assuming that the slave time offset from master is $\epsilon$, the actual time-of-arrival with respect to the master timescale is $t_2 = \tau_2 + \epsilon$.

Event C 234: Packet is transmitted by Slave that notes the time-of-departure is $\tau_3$; assuming that the slave time offset from master is $\epsilon$, the actual time-of-departure with respect to the master timescale is $t_3 = \tau_3 + \epsilon$.

Event D 236: Packet arrives at Master that measures time-of-arrival as $t_4$.

Such a two-way exchange of packets can provides information suitable for allowing the slave to align in time with the master (assuming that both sides have knowledge of the timestamps). There are four measured values that can be communicated between the Master and Slave, namely, $(t_1, \tau_2, \tau_3, t_4)$. Denoting by $\Delta_{MS}$ and $\Delta_{SM}$ the transit delays between the Master and Slave and vice versa, the following equations can be established:

$$t_4 = \tau_3 + \epsilon + \Delta_{SM} \text{ (from an } S\text{-to-}M \text{ packet)}$$

$$t_1 = \tau_2 + \epsilon - \Delta_{MS} \text{ (from a } M\text{-to-}S \text{ packet)} \quad \text{(Eq. 1)}$$

Note that there are two equations with three unknowns ($\epsilon$, $\Delta_{MS}$, $\Delta_{SM}$) so it is common in conventional PTP methods to assume reciprocity of transit delay between the two devices, thereby reducing the number of unknowns to 2 and therefore computing $\epsilon$, the slave time offset from master. This assumption implies that there is an inherent error in the time transfer that is related to the asymmetry of the transit delay in the two directions. Specifically, the error in time transfer will have an error that is nominally $$\varepsilon_A = \frac{\Delta_{MS} - \Delta_{SM}}{2} \quad \text{(Eq. 2)}$$

The asymmetry in transit delay of timing packets between slave and master provides a statistical bound to the accuracy of time transfer that can be guaranteed. Packet-based methods like PTP and NTP use separate fiber strands or fiber wavelengths for carrying the signal in the two directions (S-to-M and M-to-S). Assembly and deployment methods often include pigtails and short lengths of cable for mounting convenience. The asymmetry resulting from the different paths can be tens of nanoseconds or more. Thus the ability of traditional time-transfer methods based on PTP and NTP to accurately transfer time in a fiber-optic network is limited. The fiber links 130 and 140 could be of different lengths and this is the principal source of asymmetry. Denote the length of the fiber in the master to slave direction (130) by $x_{MS}$ and the fiber in the slave to master direction (140) as $x_{SM}$. In general $x_{MS} \neq x_{SM}$ and it is the estimate of the difference, $(x_{MS} - x_{SM})$ that is necessary to do the final time correction of the slave clock to bring it into time-alignment with the master.

There are several methods that can be postulated to address this problem. The invention described in U.S. patent application Ser. No. 12/835,586, filed on Jul. 13, 2010, the entire contents of which are incorporated by reference herein, intentionally and particularly uses the same strand of cable to carry signals in both directions. Consequently asymmetry related to cable transmission is negligible (sub-picosecond). One of the applications for the invention in U.S. patent application Ser. No. 12/835,586 is to calibrate the transit delay of fibers in a pre-deployment phase and then use this calibration data to provide the requisite correction if PTP, or NTP, or any other method that is not well suited to account for asymmetry, is used. The invention described in U.S. patent application Ser. No. 13/309,500, filed on Dec. 1, 2011, the entire contents of which are incorporated by reference herein, utilizes multiple wavelengths to ascertain the asymmetry, utilizing the fact that the propagation properties of light in the fiber differ for different wavelengths.

The invention described here recognizes that there may be asymmetry between the two fiber optic cables but still generates a correct value for slave time offset from master. According to embodiments of the invention, the transit delay asymmetry of an optical link between two network elements is estimated and thereby the fiber strands can be calibrated to enable precise synchronization of clocks embedded in each network element.

Figure 3:
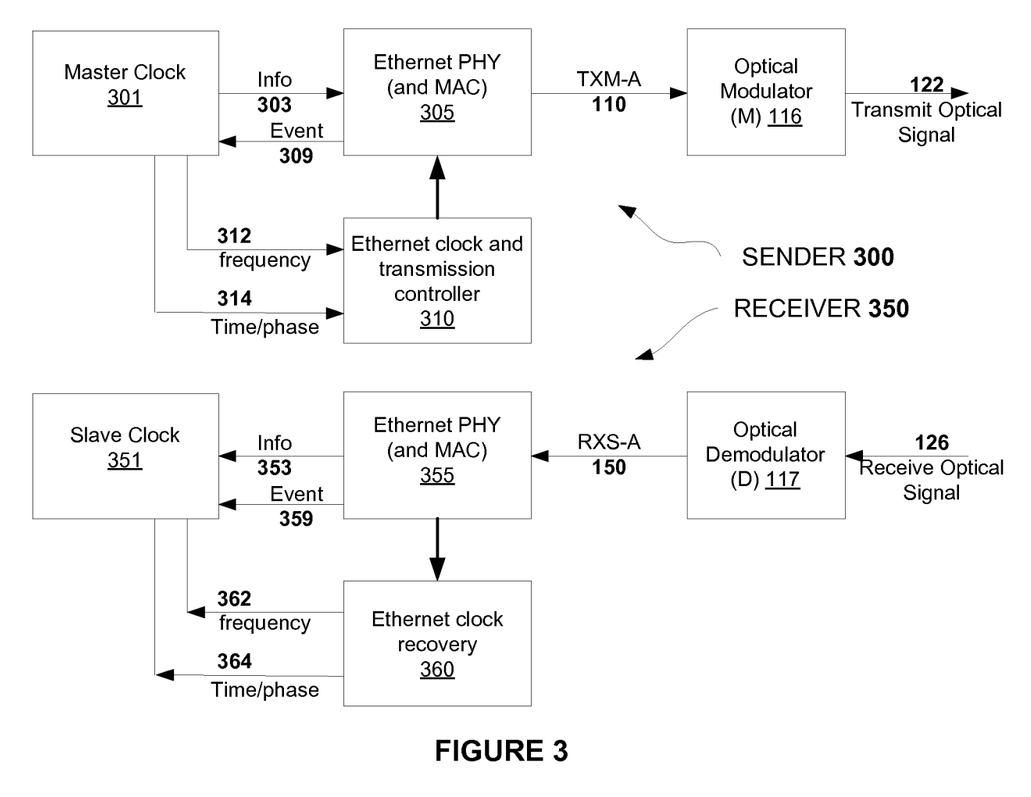
FIG. 3 depicts one embodiment of the invention and shows the transmission from master to slave.

FIG. 3 schematically illustrates one embodiment of the invention. For convenience only the send side (master-to-slave) optical signal generation is indicated. For the reverse direction the master side has receive functionality, including Ethernet clock recovery (as 360), and the slave side has transmit functionality, including Ethernet clock and transmission control (as 310). Also, only signal connections are depicted; the controller/microprocessor in the device, generally part of the clock as in FIG. 4, exerts control over the different elements.

Figure 4:
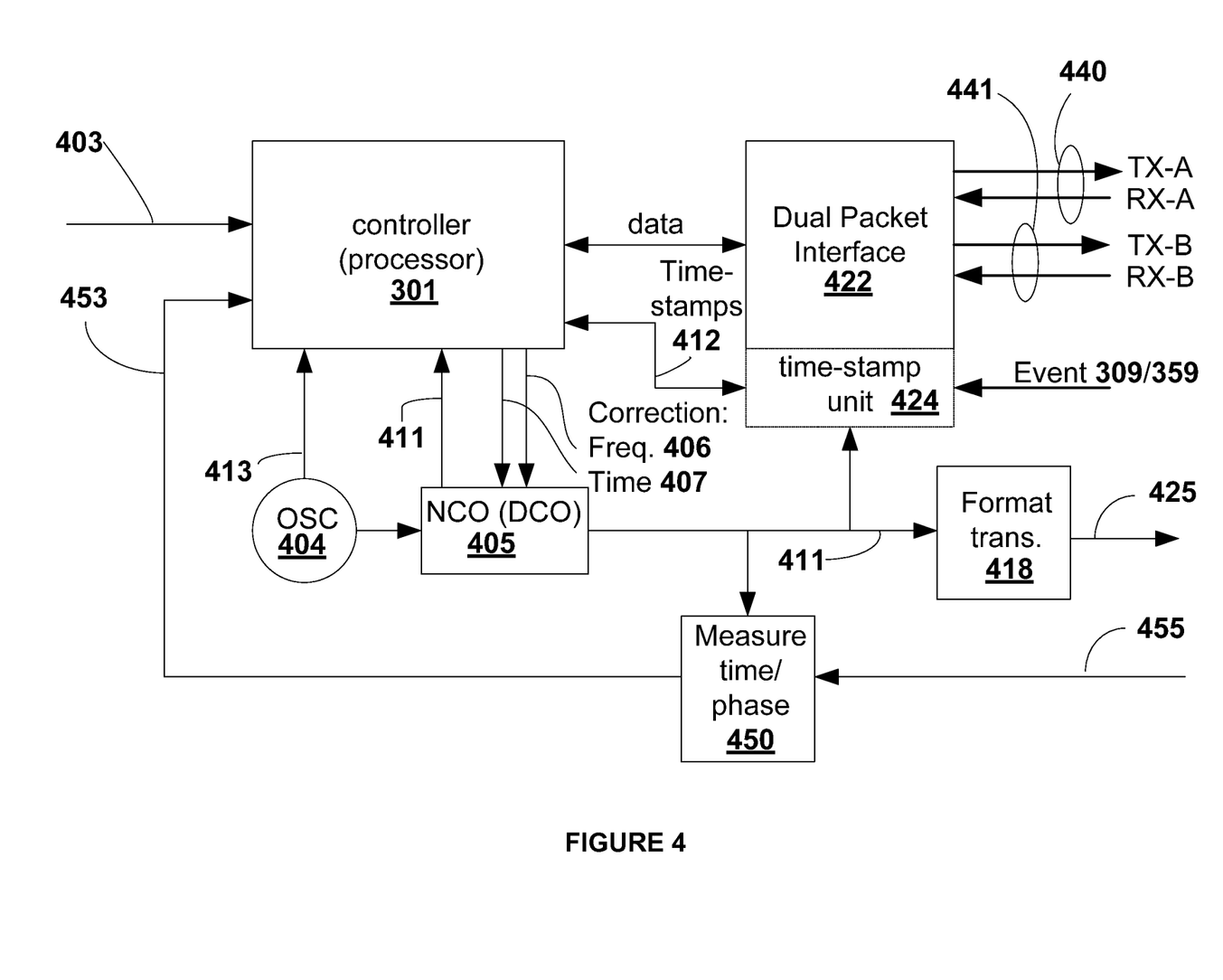
FIG. 4 depicts a suitable embodiment of the clock circuitry as considered in this invention.

The slave/master clocks are based on the circuit arrangement shown in FIG. 4. As indicated in FIG. 4, the master (and slave) clocks provide two electrical ports 440 and 441 that can support two PTP flows that are designated "A" and "B" for specificity. This functionality is particularly useful if the clocks are used in a PTP boundary clock arrangement wherein a clock serves as a master as well as a slave. A reference timing input 403 is provided to synchronize the master clock to an external reference if necessary. In a boundary clock arrangement the slave aspect locks to an upstream master and the master aspect provides timing to a downstream slave. It is known in the art that PTP master and slave clock devices can be based on near-identical hardware and descriptions of PTP operation including methods to perform time transfer robustly are provided in U.S. patent application Ser. No. 13/091,097 filed on Apr. 20, 2011, the entire contents of which are incorporated by reference herein. The embodiment considered includes the ability to provide a reference timing signal output 425 that provides frequency 312 as well as time/phase 314 control signals to the Ethernet Clock and Transmission Controller 310. The embodiment also includes the ability to receive a timing signal input 455 that represents the frequency 362 and time/phase 364 from the physical layer clock recovery 360 and apply a measurement in 450 and provide the measurement results to the controller 301 via link 353.

As indicated in FIG. 3, one PTP session designated as "A" is established between the master and the slave over the fiber-optic cable pair (the reverse direction is not explicitly indicated in FIG. 3). The Ethernet signal is generated using a controlled clock. Specifically, the clock for the physical layer is controlled by the Master Clock 301 using frequency control 312 and, further, the phase of the Ethernet clock is also under control of the Master Clock 301 via time/phase control 314. At the slave side the frequency and phase of the physical layer signal is extracted (362 and 364, respectively) and is measured by the slave clock using measurement device 450. The slave clock has the freedom to discipline the frequency of its clock using either the reference from the physical layer or from the PTP session based on time-stamps. Both master and slave clocks have the ability to control the frequency of the physical layer (Ethernet) clock and, in particular, have the ability to run the physical layer clock at a frequency $\Delta f$ (fractional units such as ppm) away from the main clock 405.

The signal travelling down the fiber is an electro-magnetic wave and the phase change along the length of the fiber can be described as the argument of the complex signal y(t) given by $$y(t)=A(t) \cdot e^{j(\kappa x - \omega t)} \tag{Eq. 3}$$

where $A(t)$ is the amplitude of the wave, $\omega$ is the angular frequency (the units are of the form radians/second), x is the distance along the fiber from the source and $\kappa$ is the wave number.

Figure 5:
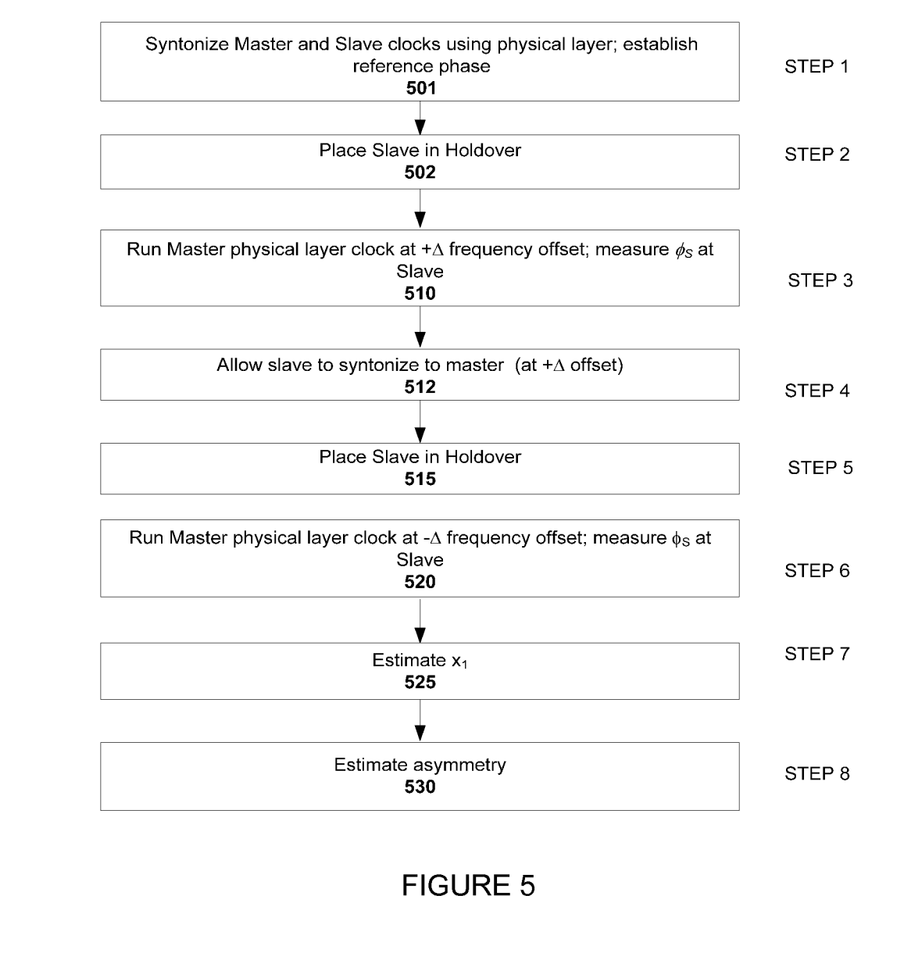
FIG. 5 provides the steps followed to estimate the asymmetry according to one embodiment of the invention.

In one method for estimating the asymmetry depicted in FIG. 5, the first step (501) is to synchronize the master and slave clocks in frequency. This can be achieved, for example, by utilizing the physical layer (501). When using the physical layer, the master side controls the Ethernet clock to an offset of $\Delta f=0$ ppm (i.e., on frequency) and the slave locks its clock in frequency to the recovered frequency 362 from the clock recovery unit 360. Alternatively, conventional PTP methods can align the two clocks in frequency and since there is a direct connection, with no intervening switches between master and slave, there is near-zero packet delay variation and thus the locking inaccuracy can be made extremely small. The slave utilizes the locked clock to establish a phase reference for additional measurements described below. Having established a steady-state phase reference for further measurements, the slave clock is placed in holdover mode (Step 2 502), thereby relying on the stability of the oscillator to hold the frequency and phase constant so that when the master transmit frequency is changed in the next step the slave reference phase remains intact.

The third step 510 is to control the master physical layer clock to run at a frequency offset of $+\Delta$. In the case of Synchronous Ethernet, as long as $\Delta$ is less than 4.6 ppm, the communication link will operate correctly since the international standard for Synchronous Ethernet requires proper operation for offsets up to 4.6 ppm. The slave needs to measure the phase of the recovered physical layer clock (314 and 364), relative to the reference established in 501. This phase measurement is $\phi_S$. Subsequent to this measurement, the slave clock is allowed to syntonize to the recovered clock in step 4 512. A new phase reference is established corresponding to the operating frequency of $+\Delta$.

The fifth step (515) is to stop disciplining the slave clock via the physical layer frequency reference and place it in a holdover mode thereby relying on the stability of the oscillator to hold the frequency and phase constant. The sixth step 520 is to control the master physical layer clock to run at a frequency offset of $-\Delta$. In the specific case of synchronous Ethernet, as long as $\Delta$ is less than 4.6 ppm, the communication link will operate correctly since the international standard for Synchronous Ethernet requires proper operation for offsets up to 4.6 ppm. The slave then needs to measure the phase of the recovered physical layer clock (314 and 364) with respect to the phase it measured when the master clock was transmitting at $+\Delta$. This phase difference is equivalent to twice the phase difference that would be measured if the reference was from step 501.

In the seventh step (525) the physical path length $x_1$ is estimated as follows. The wave equation formulation shown in (Eq. 3) establishes that the recovered clock signal at the slave side is of the form $$x_{rec}(t) \approx A \cdot \exp(j \cdot (\kappa \cdot x_1 - \omega \cdot t)) \quad \text{(Eq. 4)}$$

and consequently the phase measured at the slave side, relative to the master as reference, dropping the carrier $\omega \cdot t$ is given by $$\phi_S = \kappa \cdot x_1 \quad \text{(Eq. 5)}$$

where $x_1$ is the length of the fiber in the master-to-slave direction. The method for eliminating the carrier term $\omega \cdot t$ is straightforward since one can do a straight-line fit and measured phase, $\phi_S$, is then simply the constant term. Since the (angular) frequency is known, as explained below, the slope of the line is known, simplifying the calculation. Also note for the optical carrier, where $v$ is the speed of light in the medium, $$v = \omega/\kappa \quad \text{(Eq. 6)}$$

Denote by $\omega_0$ the nominal angular frequency. Then the angular frequency for the cases in step 2 and step 5 are:

$$\omega(\text{step2}) = \omega_0 \cdot (1+\Delta)$$

$$\omega(\text{step5}) = \omega_0 \cdot (1-\Delta) \quad \text{(Eq. 7)}$$

Denote the measured phase at the slave in step 2 for the case where the frequency offset is $+\Delta$ by $\phi_S(2)$ and the measured slave phase signals in step 5 for the case where the frequency offset is $-\Delta$ by $\phi_S(5)$; in both cases the reference phase is that developed in step 501 when the master clock is running on-frequency.

Applying (Eq. 5) and (Eq. 6) and (Eq. 7) for step 2 the following equations result:

$$\phi_S(2) = \omega_0(1+\Delta) \cdot \left(\frac{x_1}{v}\right) \quad \text{(Eq. 8)}$$

$$\phi_S(5) = \omega_0(1-\Delta) \cdot \left(\frac{x_1}{v}\right)$$

$$\phi_S(\Delta) = \phi_S(5) - \phi_S(2) = 2\omega_0\Delta \cdot \left(\frac{x_1}{v}\right)$$

Therefore $$x_1 = v \cdot \left(\frac{\varphi_S(\Delta)}{2\omega_0\Delta}\right) \quad \text{(Eq. 9)}$$

where $v$ is the velocity of propagation; $\omega_0$ is the nominal center frequency; $x_1$ is the fiber length from master-to-slave. Multiple measurements provide robustness. By measuring the phase change on the slave side it is possible to estimate $x_1$. It is well established in the art how to measure the combined path length $(x_1+x_2)$ using PTP, where $x_2$ is the slave to master length, as this is merely the round trip time multiplied by the velocity of light in the fiber, and standard PTP (IEEE 1588) provides the methods for establishing the round trip time. Therefore, knowledge of $x_1$ is sufficient to characterize the asymmetry. This asymmetry calculation comprises step 8 530. The procedure can also be run in the reverse direction over to measure $x_2$ if desired. In this reverse direction the phase measurements are made at the master and designated as $\phi_M$.

The steps of the method can be repeated in order to improve the estimate accuracy. Also, it is assumed that there is a communication link between the Master and Slave so that measurement results and computed estimates can be shared.

Figure 6:
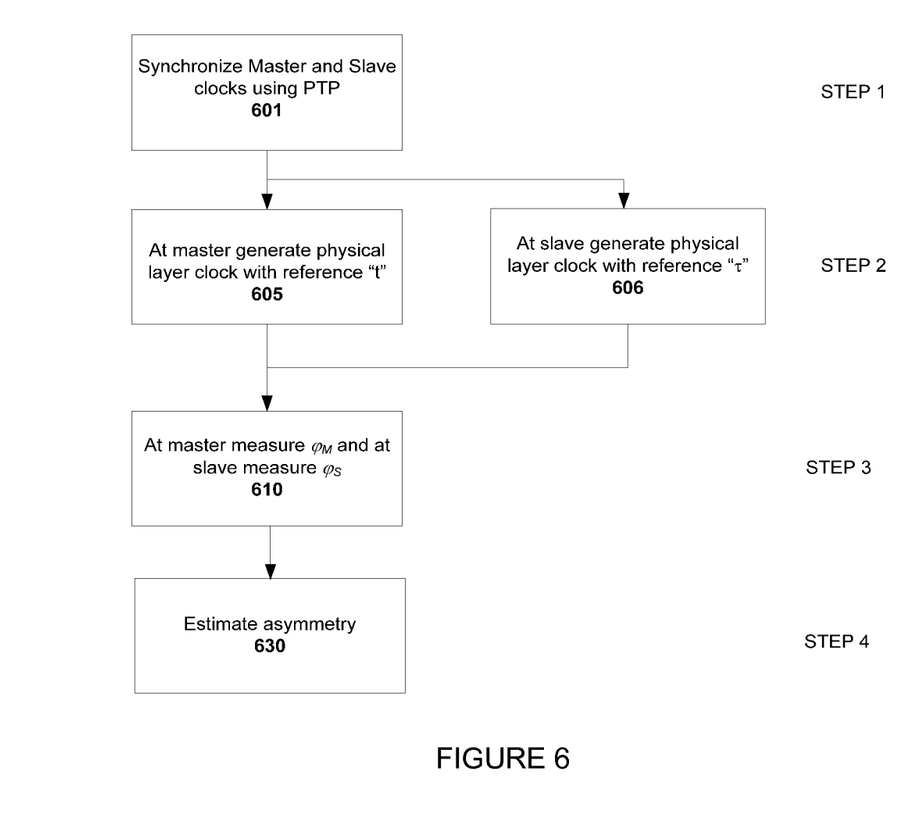
FIG. 6 provides the steps followed to estimate the asymmetry according to another embodiment of the invention.

A second method for generating an estimate of asymmetry is depicted in FIG. 6. The first step 601 is to synchronize the slave to the master using conventional PTP. It is well known that the asymmetry due to light propagation for different physical lengths in the forward and reverse directions is the principal source of synchronization error since the master and slave are directly connected over fiber links without any intervening switches/routers that could introduce packet delay variation. Thus using "t" to represent the passage of time at the master and "$\tau$" to represent passage of time at the slave, when the slave is synchronized to the master using PTP $$\tau = t + \left(\frac{x_1 - x_2}{2}\right) \cdot \left(\frac{1}{v}\right) \quad \text{(Eq. 10)}$$

The physical layer transmit of both the master and slave side are referenced to the local time (t and $\tau$ in the master and slave, respectively) (605, 606). In FIG. 6 this is shown as step 2. Then in step 3, the master side the phase difference of the transmitted wave and the received wave is measured, denoted by $\phi_M$. Similarly, the phase difference of the transmitted and received waves is measured at the slave and the measurement denoted by $\phi_S$. In step 4 the asymmetry can be estimated 630 using the formulas derived below.

The relative phase progression measured at the slave can be expressed as $$\phi_S = (\kappa \cdot x_1 - \omega_0 \cdot t) - (0 - \omega_0 \cdot \tau) \quad \text{(Eq. 11)}$$

and the relative phase progression measured at the master can be expressed as $$\phi_M = (\kappa \cdot x_2 - \omega_0 \cdot \tau) - (0 - \omega_0 \cdot t) \quad \text{(Eq. 12)}$$

and since $$\kappa = \frac{\omega_0}{v} \quad \text{(Eq. 13)}$$

combining, (Eq. 10), (Eq. 11), (Eq. 12) and (Eq. 13) yields $$\left(\frac{x_1 - x_2}{v}\right) = \frac{1}{2\omega_0} \cdot (\varphi_S - \varphi_M) \quad \text{(Eq. 14)}$$

Eq. 14 provides the estimate of the asymmetry in step 4 (630).

It can further be shown that $$x_1 = \frac{(3\varphi_S - \varphi_M)}{4\kappa} \quad \text{(Eq. 15)}$$

$$x_2 = \frac{(\varphi_S - 3\varphi_M)}{4\kappa} \quad \text{(Eq. 16)}$$

It should be noted that when measurements are done to address measurements above, they need to appropriately manage phase cycles, which is known in the art. Prior art involves a two-step process whereby the measurement is done first at a coarse and then at a fine wavelength where in the coarse measurement there less than 1 cycle across the measurement, while then the fine measurement is done with a higher wavelength where now the integer number of cycles at the higher wavelength is calculable from the first measurement.

Figure 7:
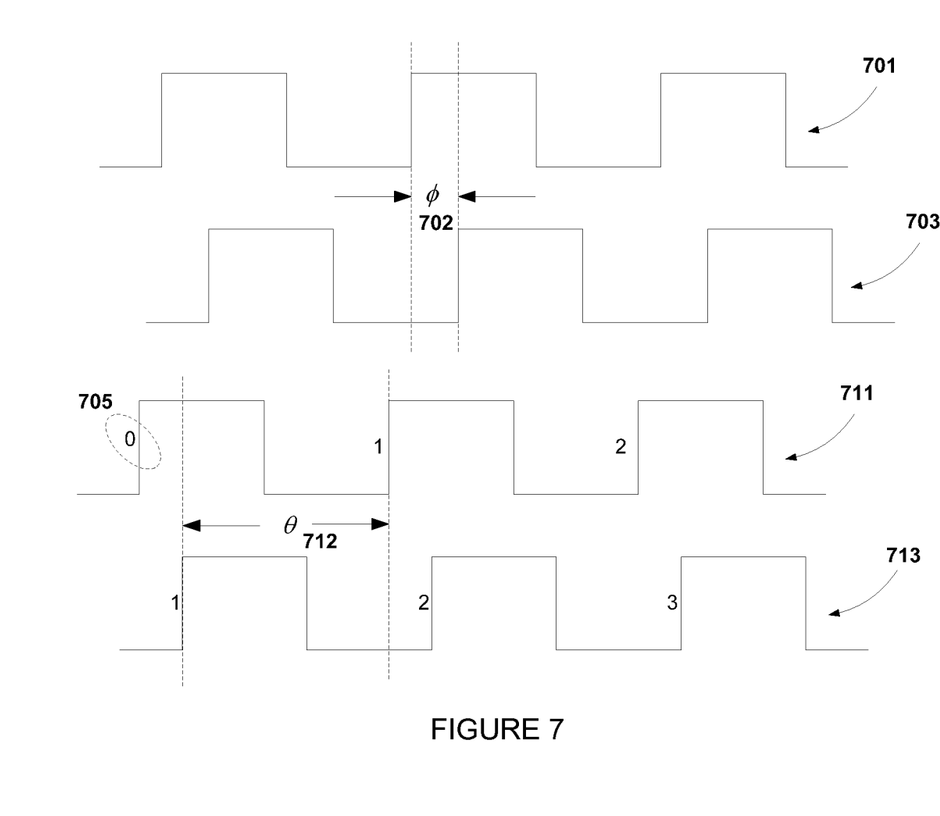
FIG. 7 depicts the method for resolving cycle ambiguity.

Cycle ambiguity can alternatively be addressed using the following approach. With reference to FIG. 7, the conventional (prior-art) method of phase difference measurement between reference clock waveform 701 and recovered clock waveform 703 provides the difference as φ 702. In prior art methods the phase difference is always between the closest edges and therefore can result in a cycle ambiguity. If the edges can be identified using, for example, numbers associated with edges (705 is one example) then the phase difference between the reference clock waveform 711 and the recovered clock waveform 713 is measured between corresponding edges as shown in FIG. 7 as θ 712. The method of numbering edges can therefore overcome the deficiency in prior art by resolving cycle ambiguity directly.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

I claim:

1. In an optical network including a first network element that is connected to a second network element over first and second optical links that are physically distinct from each other, a method for estimating an asymmetry of transit delay in the first and second optical links, the method comprising:
aligning a first clock at the first network element and a second clock at the second network element to a nominal frequency; and
subsequent to aligning the first clock and the second clock to the nominal frequency:
measuring a first phase shift at the second clock of a clock signal that is recovered when a first physical layer clock is operated, according to a first control signal from the first clock, at a frequency greater than the nominal frequency,
measuring a second phase shift at the second clock of the clock signal that is recovered when the first physical layer clock is operated, according to a second control signal from the first clock, at a frequency less than the nominal frequency, and
estimating the asymmetry of transit delay in the first and second optical links based on the measured first and second phase shifts.

2. The method according to claim 1, wherein the first phase shift is determined relative to a first phase reference corresponding to the nominal frequency, and wherein the second phase shift is determined relative to a second phase reference corresponding to the frequency greater than the nominal frequency.

3. The method according to claim 2, wherein, before measuring the second phase shift, the second clock is permitted to align to the frequency greater than the nominal frequency.

4. The method according to claim 1, further comprising repeating the steps of aligning the first and second clocks, measuring the first phase shift, measuring the second phase shift, and estimating the asymmetry based on the measured first and second phase shifts.

5. The method according to claim 1, wherein estimating the asymmetry includes estimating a path length $x_1$ of the first optical link using the formula $$x_1 = v \cdot \left( \frac{\phi_S(\Delta)}{2\omega_0 \Delta} \right),$$

where v is a velocity of propagation, $\omega_0$ is the nominal frequency, $\Delta$ is an absolute value of an offset from the nominal frequency of the frequencies greater and less than the nominal frequency, and $\phi_S(\Delta)$ is a phase difference between the first and second phases.

6. The method according to claim 1, further comprising correcting the alignment of the first and second clocks based on the estimated asymmetry.

7. The method according to claim 1, wherein correcting the alignment includes calibrating at least one of the first and second optical links based on the estimated asymmetry.

8. In an optical network including a first network element that is connected to a second network element over first and second optical links that are physically distinct from each other, a method for estimating a path length of the first optical link, the method comprising:
aligning a first clock at the first network element and a second clock at the second network element to a nominal frequency; and
subsequent to aligning the first clock and the second clock to the nominal frequency:
measuring a first phase shift at the second clock of a clock signal that is recovered when a first physical layer clock is operated, according to a first control signal from the first clock, at a frequency greater than the nominal frequency,
measuring a second phase shift at the second clock of the clock signal that is recovered when the first physical layer clock is operated, according to a second control signal from the first clock, at a frequency less than the nominal frequency, and
estimating the path length of the first optical link based on the measured first and second phase shifts.

9. The method according to claim 8, wherein the first phase shift is determined relative to a first phase reference corresponding to the nominal frequency, and wherein the second phase shift is determined relative to a second phase reference corresponding to the frequency greater than the nominal frequency.

10. The method according to claim 9, wherein the path length of the first optical link is estimated using the formula $$x_1 = v \cdot \left(\frac{\phi_S(\Delta)}{2\omega_0 \Delta}\right),$$

where $x_1$ is the path length of the first optical link, v is a velocity of propagation, $\omega_0$ is the nominal frequency, $\Delta$ is an absolute value of an offset from the nominal frequency of the frequencies greater and less than the nominal frequency, and $\phi_S(\Delta)$ is a phase difference between the first and second phases.

11. In an optical network including a first network element that is connected to a second network element over first and second optical links that are physically distinct from each other, a method for estimating an asymmetry of transit delay in the first and second optical links, the method comprising:

aligning a first clock at the first network element and a second clock at the second network element to a nominal frequency; and subsequent to aligning the first clock and the second clock to the nominal frequency:

measuring a first relative phase progression between a transmitted and a received wave at the first network element, wherein the first relative phase progression is measured with reference to a local time at the first network element, measuring a second relative phase progression between a transmitted and a received wave at the second network element, wherein the second relative phase progression is measured with reference to a local time at the second network element, and estimating the asymmetry of transit delay in the first and second optical links based on the first and second relative phase progressions.

12. The method according to claim 11, further comprising managing phase cycles while measuring the first and second relative phase progressions.

13. The method according to claim 12, wherein the phase cycles are managed by numbering edges, and wherein phase differences are measured between corresponding edges based on the numbering.

14. The method according to claim 11, wherein the asymmetry is estimated using the formula $$\left(\frac{x_1 - x_2}{v}\right) = \frac{1}{2\omega_0} \cdot (\varphi_S - \varphi_M),$$

where v is a velocity of propagation, $\omega_0$ is the nominal frequency, $x_1$ is a path length of the first optical link, $x_2$ is a path length of the second optical link, $\phi_S$ is the first relative phase progression, and $\phi_M$ is the second relative phase progression.

15. The method according to claim 11, further comprising correcting the alignment of the first and second clocks based on the estimated asymmetry.

16. The method according to claim 15, wherein correcting the alignment includes calibrating at least one of the first and second optical links based on the estimated asymmetry.

17. In an optical network including a first network element that is connected to a second network element over first and second optical links that are physically distinct from each other, a method for estimating a path length of the first optical link, the method comprising:

aligning a first clock at the first network element and a second clock at the second network element to a nominal frequency; and subsequent to aligning the first clock and the second clock to the nominal frequency:

measuring a first relative phase progression between a transmitted and a received wave at the first network element, wherein the first relative phase progression is measured with reference to a local time at the first network element;

measuring a second relative phase progression between a transmitted and a received wave at the second network element, wherein the second relative phase progression is measured with reference to a local time at the second network element; and estimating the path length of the first optical link based on the first and second relative phase progressions.

18. The method according to claim 17, further comprising managing phase cycles while measuring the first and second relative phase progressions.

19. The method according to claim 18, wherein the phase cycles are managed by numbering edges, and wherein phase differences are measured between corresponding edges based on the numbering.

20. The method according to claim 17, wherein the path length of the first optical link is estimated using one of the formulas $$x = \frac{(3\varphi_S - \varphi_M)}{4\kappa}$$

and $$x = \frac{(\varphi_S - 3\varphi_M)}{4\kappa},$$

where x is the path length of the first optical link, $\phi_S$ is the first relative phase progression, $\phi_M$ is the second relative phase progression, and $\kappa$ is equal to a nominal frequency divided by a velocity of propagation.

* * * * *